J. B. Sargent,
Picture Nail Head.
No. 2,077. Reissued Sep. 26, 1865.
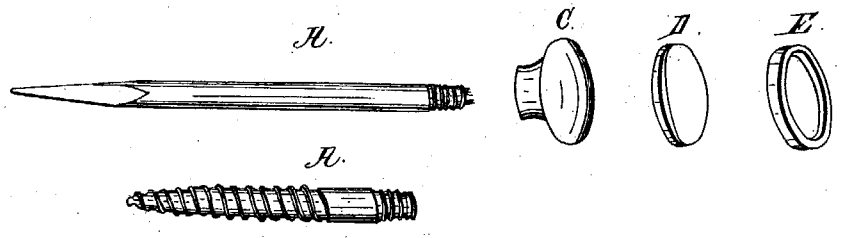
Witnesses:
A. T. Post.
N. W. Perkins.
Inventor
Joseph B. Sargent
N. PETERS, PHOTO-LITHOGRAPHER, WASHINGTON, D. C.

UNITED STATES PATENT OFFICE.

JOSEPH B. SARGENT, OF NEW BRITAIN, CONNECTICUT.

HEAD OF SCREW FOR PICTURE-FRAMES.

Specification forming part of Letters Patent No. 29,720, dated August 21, 1860; Reissue No. 2,077, dated September 26, 1865.

*To all whom it may concern:*

Be it known that I, JOSEPH B. SARGENT, of New Britain, in the county of Hartford and State of Connecticut, have invented a new and useful Improvement in the Construction of Picture Nails and Screws; and I do hereby declare that the following is a full, clear, and exact description thereof, which will enable those skilled in the art to make and use the same, reference being had to the accompanying drawings, forming part of this specification.

The nature of my invention is shown by an examination of the accompanying drawings, which, with the letters of reference thereon, form a part of this specification.

It consists in making the head or knob in three parts instead of two, as has been formerly done, the back of the head or knob C and the rim E having formerly been made in one piece, and that necessarily of brass or other expensive metal, in order to spin the front rim over the porcelain front, thereby making the cost so great as to prevent their general use, except by the wealthy.

A is the shank of a porcelain-head picture nail or screw.

C is the back part of the head or knob, tapped in its small end to receive the screw on the large end of A, and with a flat surface on the front or large end.

D is a disk or button of porcelain, or other desired material, of the same diameter as the front of C, flat on its under or back side to fit the flat surface of C, and oval or any other desired form on its upper or front side.

E is a rim or band of sheet-brass or other soft and tough metal, which is cheaply struck up to its proper shape, about one-eighth of an inch deeper than the thickness of D, with the front of it turned inwardly and made oval or of the proper shape to fit the front of D.

I screw the shank A into the small end of C, put it into a lathe, apply the disk D upon the front of C, put the rim E over the disk D, so that it extends over the junction between C and D, and then spin down the edge of E close upon the side of C, which is beveled, thus binding C and D firmly together.

Formerly the parts C and E were made of one solid piece of cast-brass, and a cavity turned out to receive the disk of porcelain, and then the edge was spun over; but I make C of cast-iron, which very much reduces the cost of the picture nail or screw without reducing its real value, as the cast-iron portion is not seen in use, and by striking up the rim E from sheet metal there is saved a large amount of labor, with a better finish than can be obtained with the cast-brass.

I claim as my invention and desire to secure by Letters Patent, as an improved article of manufacture—

A picture nail or screw provided with an ornamental head made in parts connected together, substantially as described.

JOSEPH B. SARGENT.

Witnesses:
ANDREW J. TODD,
THEO. TUSCH.